(12) United States Patent
Castellucci

(10) Patent No.: US 8,166,408 B2
(45) Date of Patent: Apr. 24, 2012

(54) MANAGEMENT OF VIRTUAL DISCUSSION THREADS IN A SYNCHRONOUS CONFERENCING SYSTEM

(75) Inventor: Antonio Castellucci, Rome (IT)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 12/348,363

(22) Filed: Jan. 5, 2009

(65) Prior Publication Data
US 2010/0175003 A1    Jul. 8, 2010

(51) Int. Cl.
*G06F 3/00* (2006.01)
(52) U.S. Cl. .......... 715/758; 715/733; 715/821; 715/845
(58) Field of Classification Search ................... 715/758, 715/733, 821, 845
See application file for complete search history.

(56) References Cited

U.S. PATENT DOCUMENTS

| | | | |
|---|---|---|---|
| 5,128,665 A * | 7/1992 | DeLuca et al. | 340/7.44 |
| 5,880,731 A * | 3/1999 | Liles et al. | 715/758 |
| 7,039,677 B2 | 5/2006 | Fitzpatrick et al. | |
| 2003/0212746 A1 * | 11/2003 | Fitzpatrick et al. | 709/206 |
| 2007/0244919 A1 | 10/2007 | Wells et al. | |

FOREIGN PATENT DOCUMENTS
WO    WO 2007/033404 A1    3/2007

* cited by examiner

*Primary Examiner* — Andrey Belousov
(74) *Attorney, Agent, or Firm* — Stephen R. Tkacs; Stephen J. Walder, Jr.; Jeffrey S. LaBaw

(57) ABSTRACT

A mechanism is provided for defining and managing virtual discussion threads in a generic synchronous conferencing system. A chat server and chat client define a virtual discussion thread (VDT) entity that includes a group of chat entries or parts of chat entries. The chat entries in a VDT logically belong to the same "hidden" discussion within a chat session. Use of the VDT enables a chat system to support a user in understanding existing discussions by showing VDTs available in the overall list of chat entries and evidencing the chat entries in a VDT.

17 Claims, 7 Drawing Sheets

MANAGEMENT OF VIRTUAL DISCUSSION THREADS IN A SYNCHRONOUS CONFERENCING SYSTEM

BACKGROUND

The present application relates generally to an improved data processing apparatus and method and more specifically to an apparatus and method for defining and managing virtual discussion threads in a generic synchronous conferencing system.

Synchronous conferencing is a term used in science, in particular in computer mediated communication, collaboration and learning, to describe text chat technologies. Today, it is also extended to describe audio/video conferencing or instant messaging systems, given they provide a text-based multiple user chat function. The word synchronous in this case describes how chat is perceived by humans. That is, the chat happens before one's eyes with messages appearing in chronological order and with each message potentially being a response to the message before it.

In a chat system, every chat entry (CE) is queued into the chat window and the understanding of current conversation is possibly by identifying a participating user's nickname (nick), user name, screen name, or alias. A chat participant reads posted messages and sends answers in a conversational manner.

The overall discussion may be as difficult as there are users participating in the chat. With many participants, the message list may scroll down very quickly, thus making it difficult to identify and read all useful messages or to answer in a reasonable time in order to be understood by the other participants.

In face-to-face interactions, several factors dictate group size for casual conversation. For instance, people are comfortable with a particular range of volume, gestures, and interpersonal distance when participating in a conversation. Therefore, when many people get together, such as at a party or intermission, the large group of people separate into smaller groups. For example, during a party with fifty guests, there may be several groups of two, three, or four people talking at any given time. The dynamics of interpersonal conversation dictate that the larger group segments into several smaller conversations.

Similarly, in synchronous conferencing, the dynamics of interpersonal communication and relationships, as well as the limitations of the technology, naturally divide the large group into smaller conversations. In a chat with a potentially large number of participants, these conversations may become very difficult to follow.

SUMMARY

In one illustrative embodiment, a method is provided in a data processing system for managing virtual discussion threads in a synchronous conferencing system. The method comprises identifying at least one chat entry belonging to a virtual discussion thread within a plurality of chat entries in a chat session, marking the at least one chat entry as belonging to the virtual discussion thread, and activating an evidence mode for the at least one chat entry.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided. The apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for defining and managing virtual discussion threads in a generic synchronous conferencing system. A chat server and chat client define a virtual discussion thread (VDT) entity that includes a group of chat entries or parts of chat entries. The chat entries in a VDT logically belong to the same "hidden" discussion within a chat session. Use of the VDT enables a chat system to support a user in understanding existing discussions by showing VDTs available in the overall list of chat entries and evidencing the chat entries in a VDT.

Figure 1:
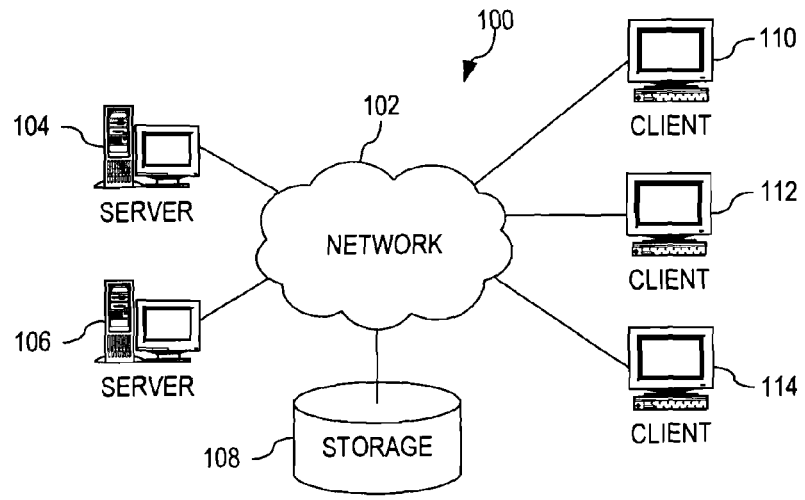
FIG. 1 depicts a pictorial representation of an example distributed data processing system in which aspects of the illustrative embodiments may be implemented.
Figure 2:
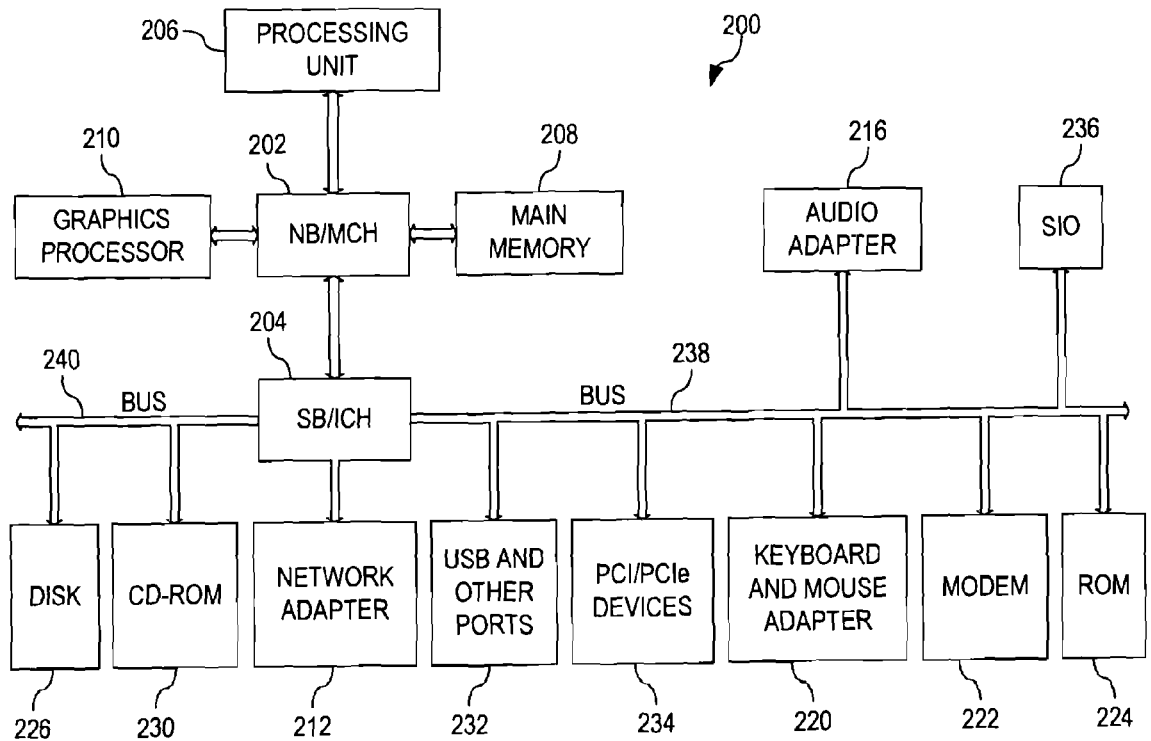
FIG. 2, a block diagram of an example data processing system is shown in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation, this is only an example and is not intended to state or imply any limitation with regard to the features of the present invention. To the contrary, the illustrative embodiments are intended to include distributed data processing environments and embodiments.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

In one illustrative embodiment, server 104, for example, may be a chat server. Clients 110-114 may be clients of participants in a chat. Although not shown, a chat may have only two participants or many participants, perhaps hundreds or more. In this example embodiment, a chat may be any synchronous conferencing, such as a text chat, audio/video conferencing, instant messaging, and the like. Examples of synchronous conferencing technologies may include Internet Relay Chat (IRC), Jabber (XMPP), multi-user dungeons (MUDs) and massively multi-player online role playing games (MMORPGs), Protocol for Synchronous Conferencing (PSYC), and Web chats.

Generally, chat services can be categorized into two main types: one-to-one and group chat. One-to-one chat services, such as instant messaging (IM) services, typically involve chatting between two participants, although some IM services allow more than two participants. Group chats allow hundreds, perhaps thousands, of people to connect at the same time, because messages are broadcast to all the people who are connected to the group or channel. Channels are usually defined based on the topic content and language used by participants, and conversation chat windows may be one for every channel.

In the depicted example, server 104 may manage authentication and authorization to access the chat service. Server 104 may also be responsible for the reception and delivery of messages among the connected users. Client 110, for example, provides an interface between the user and the chat server. Normally, client 110 provides a chat window where messages are displayed in a chronological list. The chat window may also include a text box in which the user may type a current message or chat entry (CE) for delivery to the chat server. The chat window may further include a display box to present information received from the chat server, such as the number of connected users, nicknames, and the like.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3A:
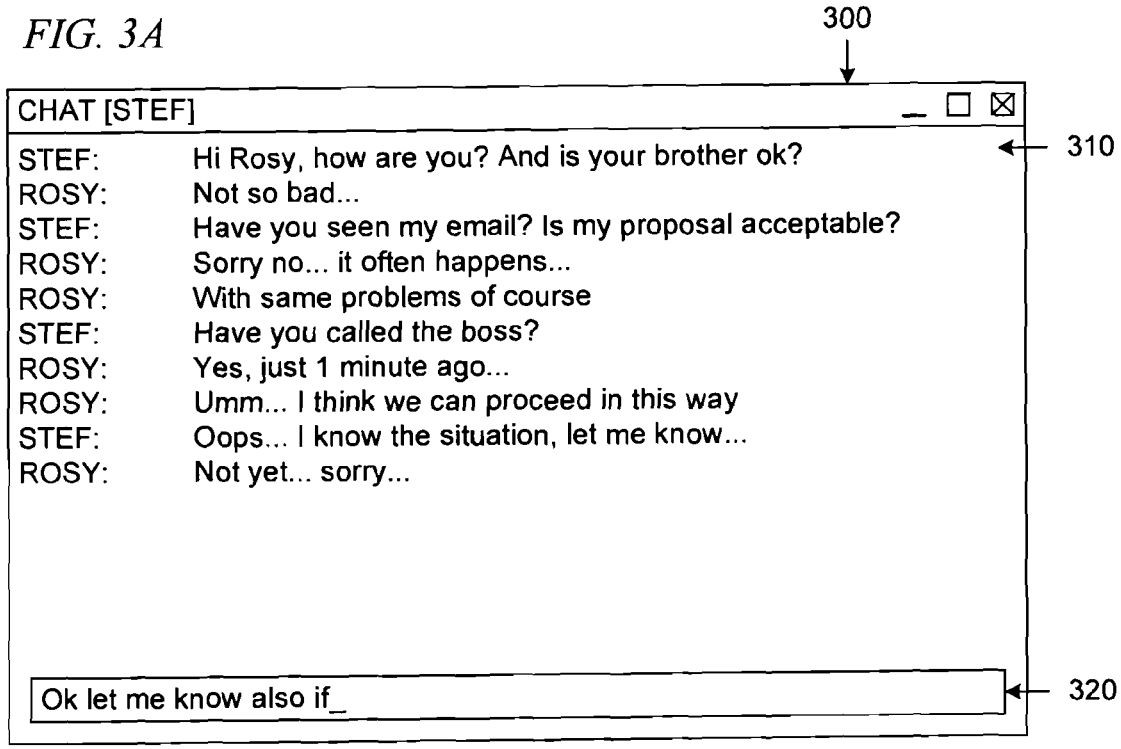
FIG. 3A illustrates a chat window in a typical chat session.

FIG. 3A illustrates a chat window in a typical chat session. Chat window 300 includes a display portion 310 that presents every chat entry (CE) queued in chronological order of receipt. Chat window 300 also includes CE text field 320 for entry of a current CE to be sent to the chat server. Chat window 300 depicts a conversation between two participants, Stef and Rosy.

The overall discussion may be as difficult as there are users participating in the chat. With many participants, the message list may scroll down very quickly, thus making it difficult to identify and read all useful messages or to answer in a reasonable time in order to be understood by the other participants. This typical behavior—where chat messages are displayed in the order they are received from the chat server—causes the listed CEs in display portion 310 to not have any logical order in order to help follow a given conversation.

Figure 3B:
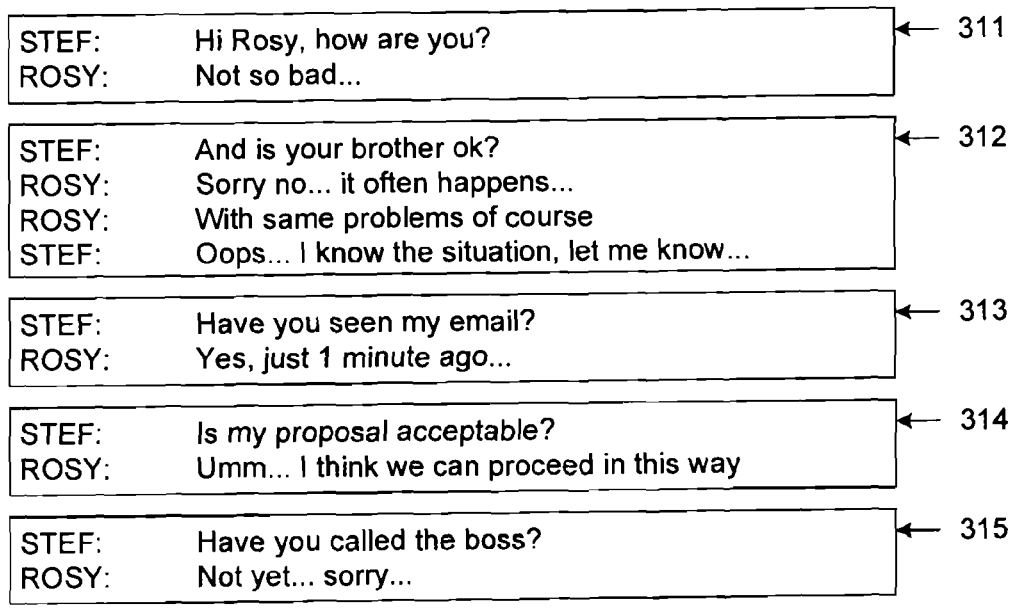
FIG. 3B depicts an example of sub-conversations that may occur within a one-to-one chat.

As seen in FIG. 3A, while this problem may be stressed in the group chat case, even a conversation between two participants may have a plurality of sub-conversations. It is natural for people to start new threads in a conversation, often holding several sub-conversations during the course of the interaction. In fact, a person who is skilled in the art of conversation may effortlessly weave several threads at a time, creating a sense of intrigue and time-distortion that is effective and enjoyable. FIG. 3B depicts an example of sub-conversations that may occur within a one-to-one chat. More particularly, the conversation between Stef and Rosy illustrated in the display portion 310 of chat window 300 in FIG. 3A may include sub-conversations 311-315. As seen in FIG. 3B, a logical discussion or sub-conversation may be based on a single CE or a portion of a CE, such as a sentence, a set of words or a single word. However, the chronological listing of CEs in display portion 310 makes it very difficult to follow each sub-conversation.

One solution is to organize chat messages in a hierarchical tree structure by posting a response CE under the message to which an answer is directed. In order to answer a previous message, the user must search through the chat history, find the particular chat message to which the user wishes to respond, and insert a response under the identified chat message. Often, chat messages of a particular session extend outside the viewable portion of the display; therefore, the user must scroll the chat history to locate relevant chat messages. Also, every chat response appears under the logical tree structure where the sending user inserted the chat entry. The recipient must scroll through the chat history and find the message in order for the message to be communicated. This can be very cumbersome if the user engages in multiple conversations with a plurality of participants.

Another solution is to use separate channels for each separate sub-conversation. However, this approach requires a user to monitor a plurality of chat windows, and users are much less likely to jump in and out of continuous conversations. This solution can also significantly increase the time required for a user to respond to a chat message, especially in cases where a user is actively participating in multiple conversations.

Figure 4:
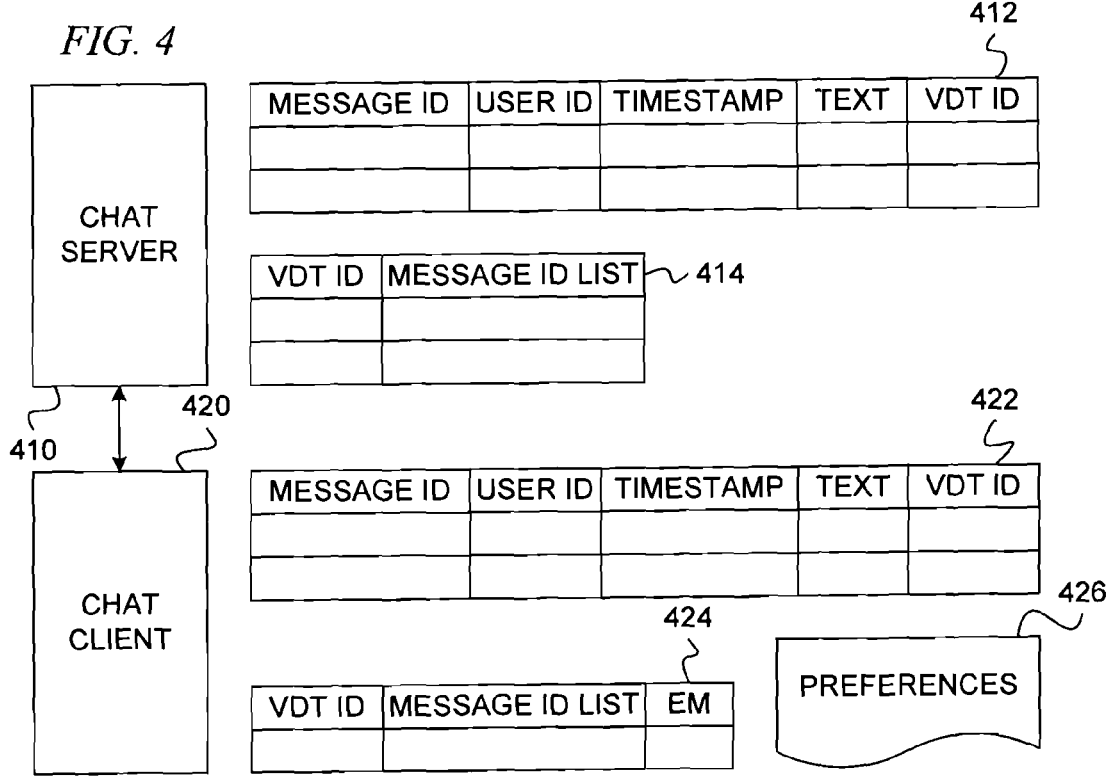
FIG. 4 is a block diagram depicting a chat system supporting virtual discussion threads in accordance with an illustrative embodiment.

In accordance with an illustrative embodiment, the chat server and chat client define a virtual discussion thread (VDT) entity, which includes a group of CEs or portions of CEs belonging to the same sub-conversation within a chat session. FIG. 4 is a block diagram depicting a chat system supporting virtual discussion threads in accordance with an illustrative embodiment. Chat client 420 connects to chat server 410. While one chat client is shown in FIG. 4, at least two, and perhaps many, chat clients may connect to chat server 410. In the example depicted in FIG. 4, chat server 410 manages one chat session on one channel, although in actual implementation, chat server 410 may manage many chat sessions on many channels.

Chat server 410 stores a chat session data structure 412 to monitor chat entries within the chat. As used herein, the term "chat entry" (CE) refers to an entry in data structure 412, while the term "chat message" may refer to either the actual text of the message or the chat entry itself. Each entry in chat session data structure 412 includes a message identifier (ID), user ID, timestamp, text, and virtual discussion thread ID.

The message ID is a unique identifier assigned by chat client 420 or alternatively by chat server 410. The user ID is a unique identifier that is either assigned by the chat client 420 or chat server 410 or chosen by the user. For example, the user ID may be a nickname, alias, user name, screen name, or the like. The timestamp may be a time/date value that identifies either the time the chat message was sent from chat client 420 or the time the chat message was received by chat server 410. The text is the actual text of the message. While the depicted example describes a text chat, the message may be an audio message, video message, or any other message that may be presented in a conversational manner.

Chat client 420 also maintains a chat session data structure 422. Each CE in data structure 422 includes a message ID, user ID, timestamp, text, and VDT ID. Initially, a first CE may not have a VDT ID, in which case the VDT ID will have a default or null value. When a user identifies one or more messages, or portions of messages, within the chat session that are part of a virtual discussion, the CEs are assigned a VDT ID. If a plurality of portions of the text are identified as being part of different VDTs, a CE may have a plurality of VDT IDs.

As a specific example, a user may select an existing chat message to which the user would like to respond to begin a virtual discussion. Chat client 420 may then assign a VDT ID to the CE of the selected message and to the chat message being submitted by the user. Each time the user submits a message, the user may select a message to which the user is responding, may select a virtual discussion indicator, or may submit the message on its own. If the user submits the message on its own, another user may respond to that message to start a virtual discussion within the chat session.

Chat server 410 maintains a virtual discussion data structure 414 that includes a VDT ID and a message ID list. Chat client 420 also maintains a virtual discussion data structure 424 that manages existing virtual discussions in the chat session. Each virtual discussion entry in data structure 424 includes a VDT ID, a message ID list, and an evidence mode field. Message ID list may simply include a list of message IDs that identify the CEs that belong to the virtual discussion. In one example embodiment, the message ID list may include message IDs as well as coordinates that identify a portion of the message. For instance, the coordinates may be a start position and an end position that identify the first and last characters of the portion of the message that belongs to the virtual discussion.

The evidence mode (EM) field may be an on/off field that indicates whether the virtual discussion is evidenced using a highlighting technique. The EM field may also include an identification of the highlighting technique. The highlighting technique may be a graphical indicator, a color, an increased font size, bold or Italics, or the like. In one exemplary embodiment, the highlighting technique may be hiding chat entries and portions of chat entries that do not belong to the virtual discussion thread.

Chat client 420 may manage virtual discussions using user preferences 426. Preferences 426 may indicate how the user wishes to group messages into virtual discussions, how the user wishes to apply evidence mode, and so forth. For example, one user may prefer to have all submitted messages assigned to a currently selected VDT, while another user may prefer to have a submitted message assigned to a VDT only when specifically instructed by the user. A user may also have a preferred order of evidence modes to be applied to VDTs. A user may also prefer to have only one VDT evidenced at a time, for example. Other user preferences may become apparent to a person of ordinary skill in the art when implementing the illustrative embodiments.

Chat server 410, through the VDT ID field in chat session data structure 412 and through VDT data structure 414, manages and tracks VDTs of all participants involved in the chat. Thus, chat server 410 coordinates the VDT IDs of all connected chat clients. The evidence mode may be unique to each chat client; however, chat server 410 may coordinate and maintain message IDs, user IDs, and VDT IDs so that the VDT experience is the same at each chat client. Thus, if one user defines one set of CEs to belong to a VDT, and an originator of one of the CEs disagrees, the originator may reassign the CE to another VDT. The chat client may then submit that change to the chat server 410, which would then store the change in data structures 412 and 414 and propagate the change to chat client 420.

Figure 5:
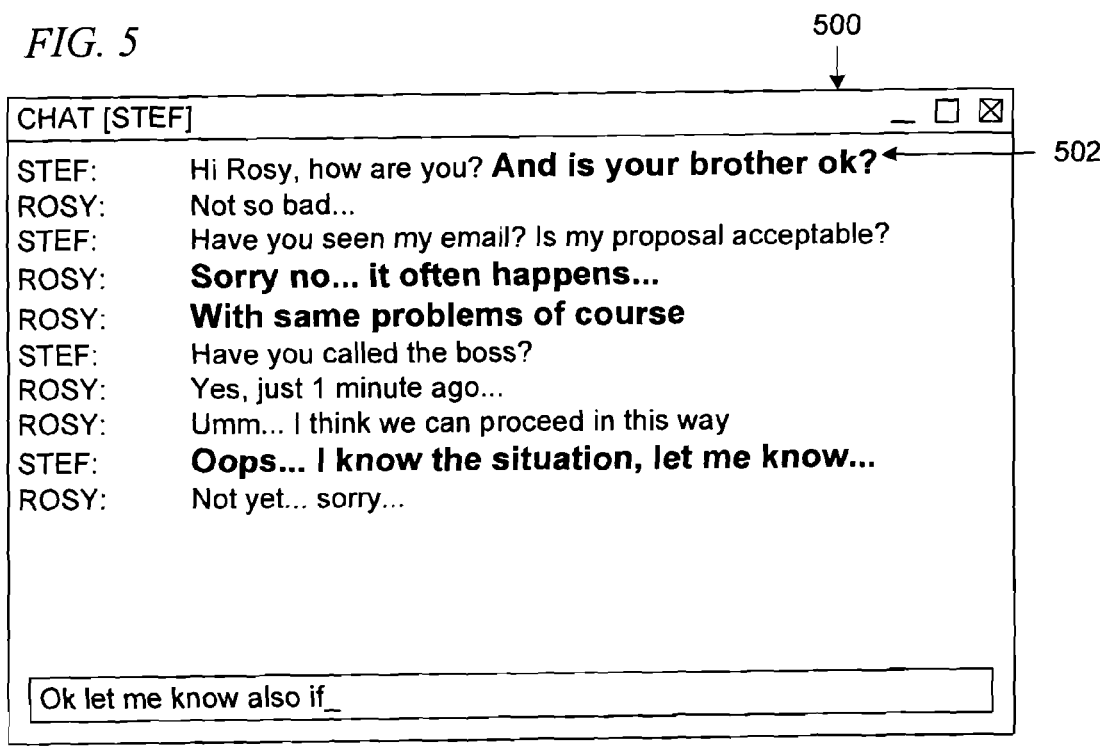
FIG. 5 illustrates a chat window with a virtual discussion thread evidence mode in accordance with an example embodiment.

FIG. 5 illustrates a chat window with a virtual discussion thread evidence mode in accordance with an example embodiment. Chat window 500 may present the chat session shown in display portion 310 in FIG. 3A with an evidence mode highlighting a selected virtual discussion thread (VDT). More particularly, a message portion 502 is identified to belong to a VDT and is highlighted using increased font size and bold typeface according to a selected evidence mode.

Figure 6A:
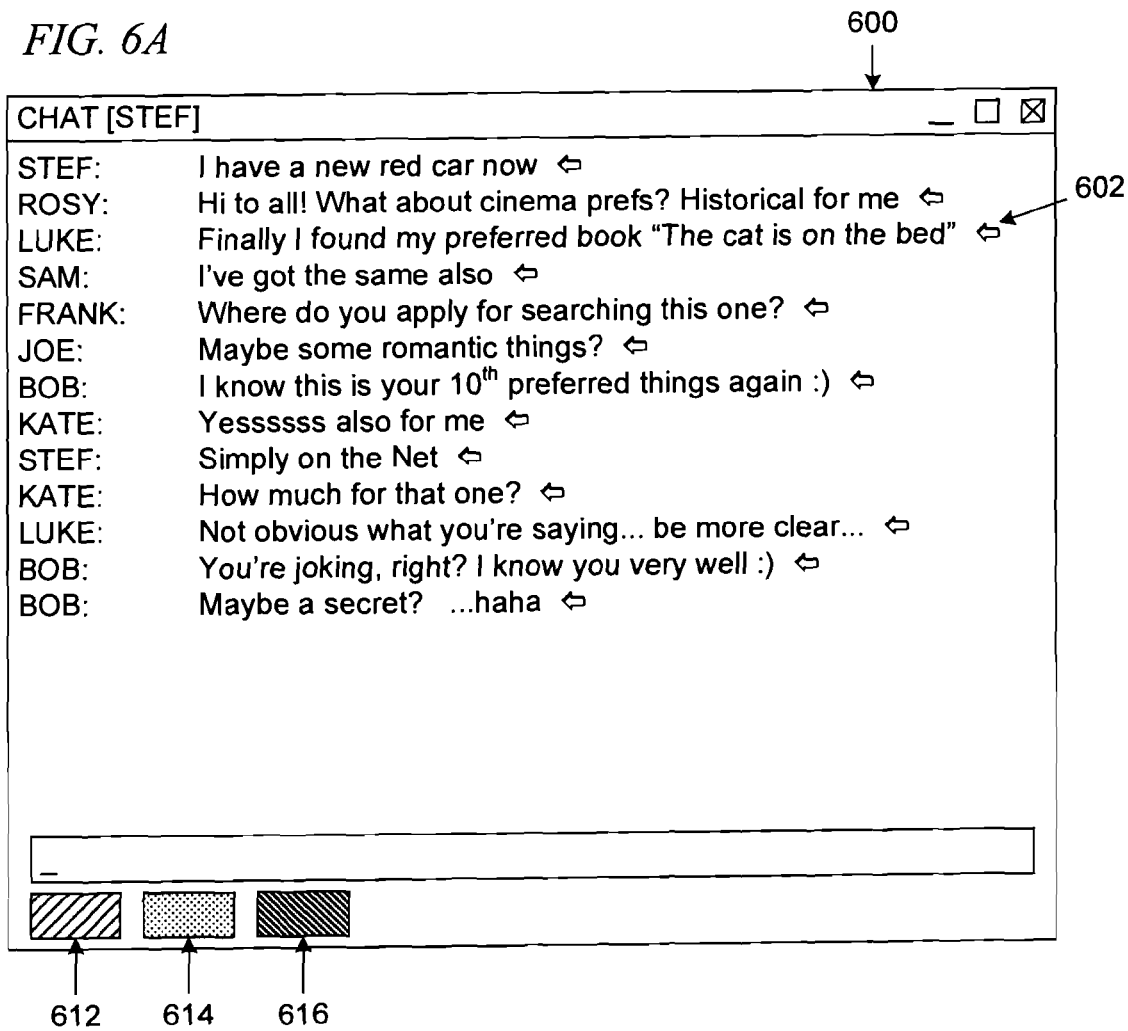
FIGS. 6A and 6B illustrate chat windows with group chat and virtual discussion thread evidence modes in accordance with an illustrative embodiment.
Figure 6B:
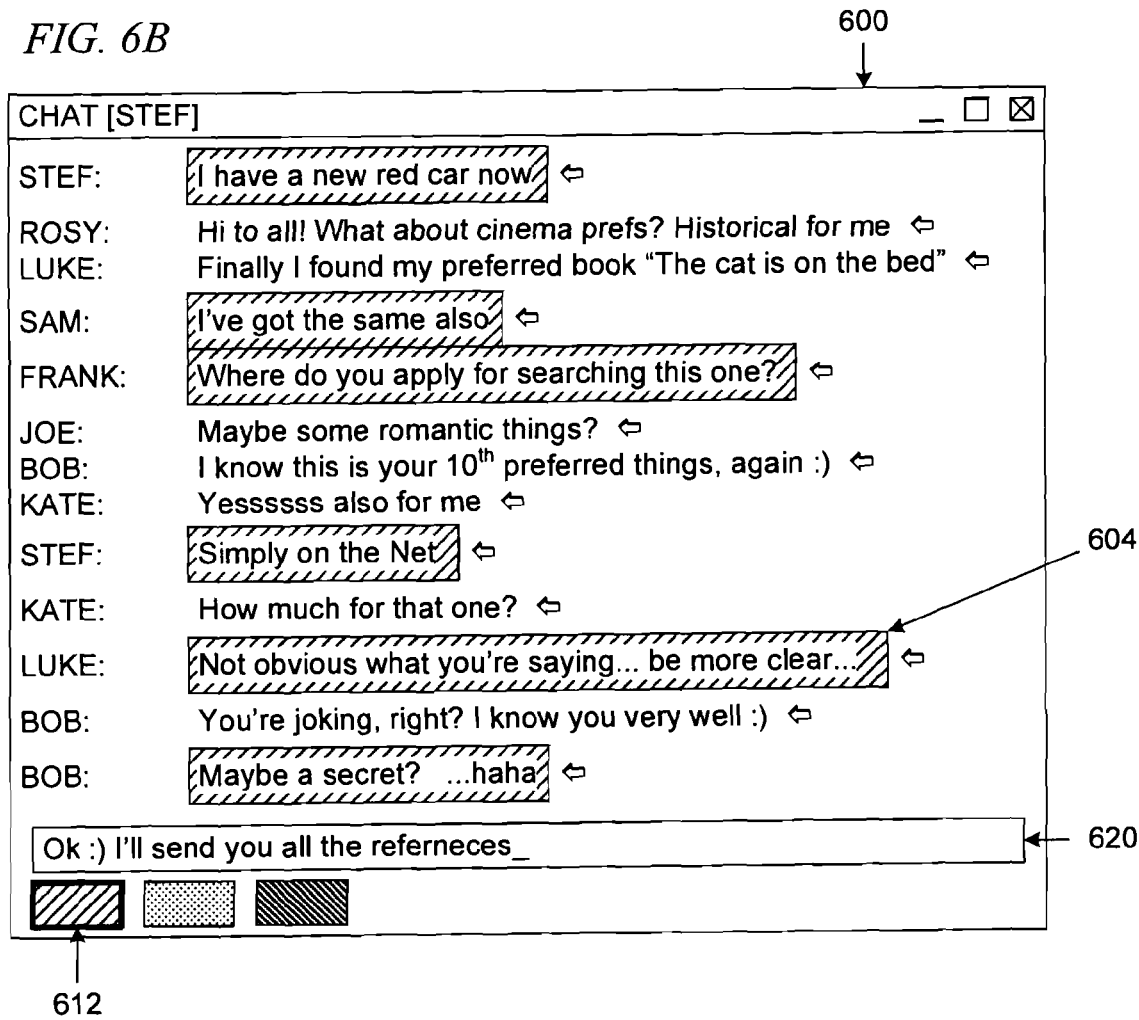

FIGS. 6A and 6B illustrate chat windows with group chat and virtual discussion thread evidence modes in accordance with an illustrative embodiment. FIG. 6A illustrates chat window 600 with a group chat having more than two participants. As can be seen in FIG. 6A, a group chat with many participants, in this case eight participants, may fractionate into several sub-conversations, referred to herein as virtual discussion threads (VDTs). Chat window 600 includes a graphical indicator 602 that may be selected by the user to respond to a specific message to create a VDT. For example, responsive to the user selecting graphical indicator 602 and submitting a message, the chat client assigns a VDT ID to the chat entry (CE) associated with graphical indicator 602 and the CE associated with the current text message.

In one example embodiment, chat window 600 includes VDT buttons 612, 614, 616. Each VDT button 612, 614, 616 may be associated with an existing VDT ID. In other words, there may be a VDT button for each VDT in the chat session. A user may select one or more graphical indicators, such as graphical indicator 602, and select one of VDT buttons 612, 614, 616 to group CEs into a VDT. In addition, a user may select a portion of a message to be grouped into a VDT. VDT buttons 612, 614, 616 may also be used to turn on/off the evidence mode associated with their respective VDTs.

FIG. 6B illustrates chat window 600 with evidence mode turned on for the VDT associated with VDT button 612. In the depicted example, VDT button 612 is selected, and the evidence mode is enabled for that VDT. Thus, the CEs in the VDT associated with VDT button 612, such as CE 604, are highlighted using the evidence mode associated with the VDT. Furthermore, with VDT button 612 selected, the chat client may assign the current message in CE text field 620 to the VDT associated with VDT button 612.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
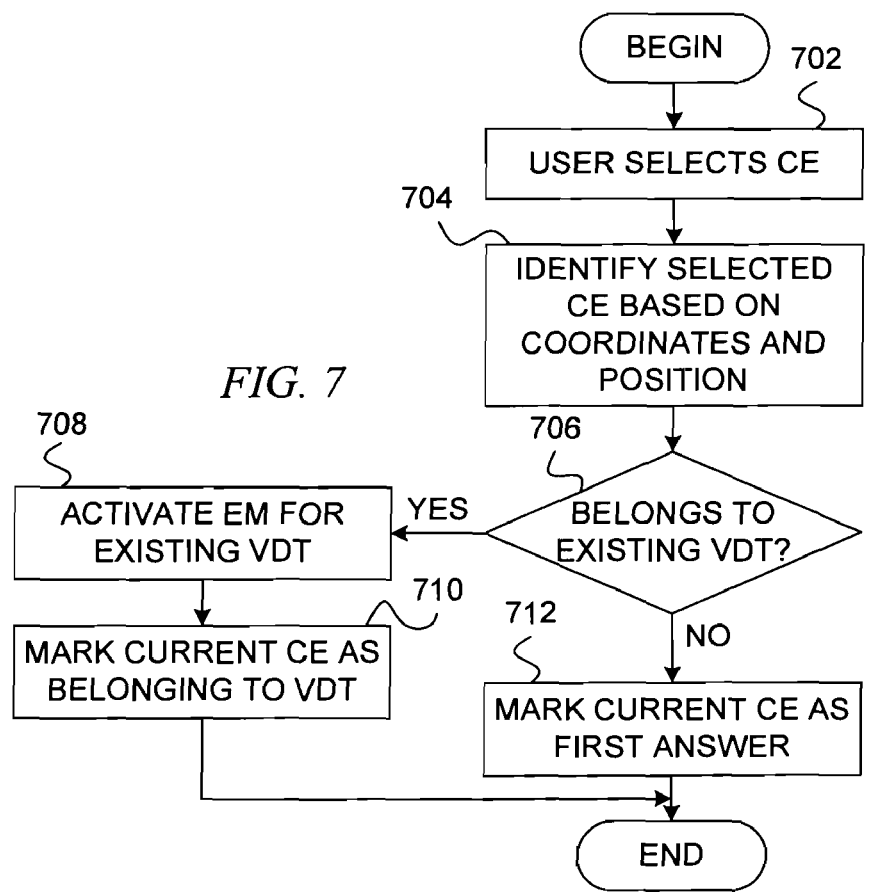
FIG. 7 is a flowchart illustrating selection management of a virtual discussion thread in accordance with an illustrative embodiment.

FIG. 7 is a flowchart illustrating selection management of a virtual discussion thread in accordance with an illustrative embodiment. Operation begins, and the user selects a chat entry (CE) (block 702). The chat client identifies the selected CE based on coordinates and position (block 704) and determines whether the selected CE belongs to an existing virtual discussion thread (VDT) (block 706).

If the selected CE belongs to an existing VDT, the client activates the evidence mode (EM) for the existing VDT (block 708). Then, the chat client marks the current CE as belonging to the VDT (block 710). Thereafter, operation ends. If the selected CE does not belong to an existing VDT in block 706, the chat client marks the current CE as a first answer to the selected CE (block 712), and operation ends.

Figure 8:
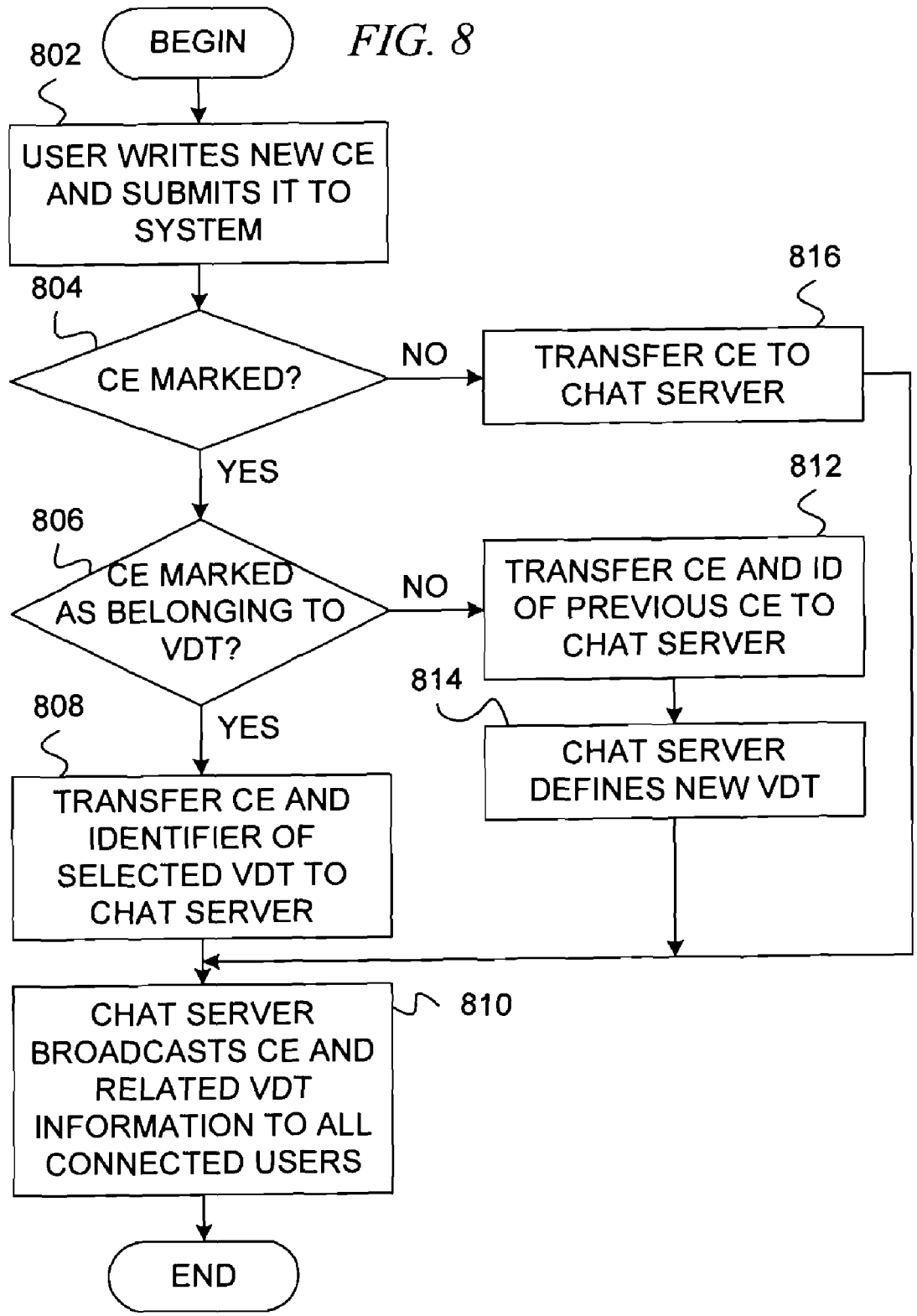
FIG. 8 is a flowchart illustrating chat entry sending management in accordance with an illustrative embodiment.

FIG. 8 is a flowchart illustrating chat entry sending management in accordance with an illustrative embodiment. Operation begins, and the user writes a new CE and submits it to the chat system (block 802). The chat client determines whether the new CE is marked through any selection (block 804), as discussed above with reference to FIG. 7. If the CE is marked, the chat client determines whether the CE is marked as belonging to an existing VDT (block 806).

If the CE is marked as belonging to an existing VDT, the chat client transfers the CE and an identifier of the selected VDT to the chat server (block 808). Then, the chat server broadcasts the CE and related VDT information, if any, to all connected users (block 810), and operation ends. Note that for block 810, related VDT information may be null or empty if the current CE does not belong to an existing VDT.

If the CE is not marked as belonging to an existing VDT in block 806, then the chat client transfers the CE and an identifier of the previous CE to the chat server (block 812). Then, the chat server defines a new VDT (block 814). Next, operation proceeds to block 810 where the chat server broadcasts the CE and related VDT information to all connected users, and operation ends.

Returning to block 804, if the CE is not marked through any selection, the chat client transfers the CE to the chat server (block 816). Next, operation proceeds to block 810 where the chat server broadcasts the CE and related VDT information to all connected users, and operation ends.

Figure 9:
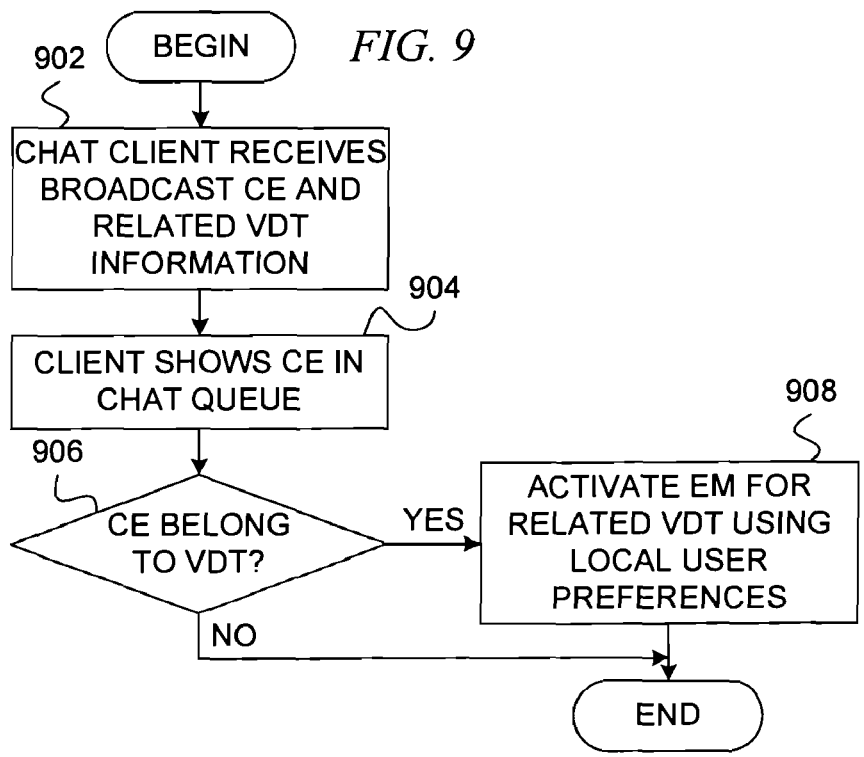
FIG. 9 is a flowchart illustrating chat entry reception management in accordance with an illustrative embodiment.

FIG. 9 is a flowchart illustrating chat entry reception management in accordance with an illustrative embodiment. Operation begins, and the chat client receives a broadcast CE and related VDT information (block 902). The client shows the CE in the chat queue (block 904). The chat client determines whether the CE belongs to a VDT (block 906). If the CE does not belong to a VDT, then operation ends. If the CE belongs to a VDT in block 906, then the chat client activates the evidence mode for the related VDT using local user preferences (block 908). Thereafter, operation ends.

Thus, the illustrative embodiments provide a mechanism for defining and managing virtual discussion threads in a generic synchronous conferencing system. A chat server and chat client define a virtual discussion thread (VDT) entity that includes a group of chat entries or parts of chat entries. The chat entries in a VDT logically belong to the same "hidden" discussion within a chat session. Use of the VDT enables a chat system to support a user in understanding existing discussions by showing VDTs available in the overall list of chat entries and evidencing the chat entries in a VDT.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for managing virtual discussion threads in a synchronous conferencing system the method comprising:

storing sent and received chat entries in a chat session data structure wherein the chat session data structure stores a history of chat entries of a chat session;

receiving user selection of a plurality of chat entries belonging to a virtual discussion thread in a chat session graphical user interface of the chat session;

marking the plurality of chat entries as belonging to the virtual discussion thread in the chat session data structure, wherein each chat entry within plurality of chat entries in the chat session data structure comprises a message identifier, a user identifier, a timestamp, a chat message text, and a virtual discussion thread identifier;

adding a message identifier for each of the plurality of chat entries to a virtual discussion entry in a virtual discussion data structure, wherein the virtual discussion entry in the virtual discussion data structure comprises a virtual discussion thread identifier, a message identifier list, and an evidence mode field; and activating an evidence mode corresponding to the evidence mode field for the plurality of chat entries in the chat session graphical user interface;

wherein receiving user selection of the plurality of chat entries comprises:

receiving user selection of a portion of a chat message associated with a given chat entry within the plurality of chat entries; and identifying coordinates of the selected portion of the chat message, wherein the coordinates comprise a start position and end position that identify the first and last characters of the selected portion of the chat message that belongs to the virtual discussion thread, wherein marking the plurality of chat entries as belonging to the virtual discussion thread comprises storing the coordinates in association with the message identifier of the chat message in the given chat entry in the chat session data structure such that an unselected portion of the chat message is not marked as belonging to the virtual discussion thread.

2. The method of claim 1, wherein receiving user selection of the plurality of chat entries comprises:

receiving user selection of a graphical indicator associated with a given chat entry within the plurality of chat entries.

3. The method of claim 1, further comprising:

receiving a current chat message;

generating a current chat entry for the current chat message in the chat session data structure;

marking the current chat entry as belonging to the virtual discussion thread; and adding a message identifier of the current chat message to the virtual discussion entry of the virtual discussion thread in the virtual discussion data structure.

4. The method of claim 3, further comprising:

transferring the chat entry to a chat server.

5. The method of claim 1, further comprising:

receiving a broadcast chat entry and related virtual discussion thread information for the broadcast chat entry from a chat server;

determining whether the broadcast chat entry belongs to the virtual discussion thread based on the related virtual discussion thread information; and responsive to a determination that the broadcast chat entry belongs to the virtual discussion thread, adding a message identifier of the broadcast chat entry to the virtual discussion entry of the virtual discussion thread in the virtual discussion data structure and activating the evidence mode for the broadcast chat entry.

6. The method of claim 1, wherein activating the evidence mode for the plurality of chat entries comprises:
receiving user selection of the virtual discussion thread; and
activating the evidence mode responsive to the selection of the virtual discussion thread.

7. The method of claim 6, wherein receiving user selection of the virtual discussion thread comprises one of receiving user selection of a given chat entry within the plurality of chat entries, receiving user selection of a portion of a given chat entry within the plurality of chat entries, or receiving user selection of a graphical control associated with the virtual discussion thread.

8. The method of claim 1, wherein the evidence mode comprises hiding chat entries that do not belong to the virtual discussion thread.

9. The method of claim 1, wherein activating the evidence mode for the plurality of chat entries comprises activating the evidence mode based on user preferences.

10. A computer program product comprising a computer recordable medium having a computer readable program recorded thereon, wherein the computer readable program, when executed on a computing device, causes the computing device to:
store sent and received chat entries in a chat session data structure, wherein the chat session data structure stores a history of chat entries of a chat session;
receiving user selection of a plurality of chat entries belonging to a virtual discussion thread in a chat session graphical user interface of the chat session;
mark the plurality of chat entries as belonging to the virtual discussion thread in the chat session data structure, wherein each chat entry within the plurality of chat entries in the chat session data structure comprises a message identifier, a user identifier, a timestamp, a chat message text, and a virtual discussion thread identifier;
add a message identifier for each of the plurality of chat entries to a virtual discussion entry in a virtual discussion data structure, wherein the virtual discussion entry in the virtual discussion data structure comprises a virtual discussion thread identifier, a message identifier list, and an evidence mode field; and
activate an evidence mode corresponding to the evidence mode field for the plurality of chat entries in the chat session graphical user interface;
wherein receiving user selection of the plurality of chat entries comprises:
receiving user selection of a portion of a chat message associated with a given chat entry within the plurality of chat entries; and
identifying coordinates of the selected portion of the chat message, wherein the coordinates comprise a start position and end position that identify the first and last characters of the selected portion of the chat message that belongs to the virtual discussion thread, wherein marking the plurality of chat entries as belonging to the virtual discussion thread comprises storing the coordinates in association with the message identifier of the chat message in the given chat entry in the chat session data structure such that an unselected portion of the chat message is not marked as belonging to the virtual discussion thread.

11. The computer program product of claim 10, wherein the evidence mode comprises hiding chat entries that do not belong to the virtual discussion thread.

12. The computer program product of claim 10, wherein the computer readable program further causes the computing device to:
receive a current chat message;
generate a current chat entry for the current chat message in the chat session data structure;
mark the current chat entry as belonging to the virtual discussion thread; and
add a message identifier of the current chat message to the virtual discussion entry of the virtual discussion thread in the virtual discussion data structure.

13. The computer program product of claim 10, wherein the computer readable program further causes the computing device to:
receive a broadcast chat entry and related virtual discussion thread information for the broadcast chat entry from a chat server;
determine whether the broadcast chat entry belongs to the virtual discussion thread based on the related virtual discussion thread information; and
responsive to a determination that the broadcast chat entry belongs to the virtual discussion thread, add a message identifier of the broadcast chat entry to the virtual discussion entry of the virtual discussion thread in the virtual discussion data structure and activate the evidence mode for the broadcast chat entry.

14. An apparatus, comprising:
a processor; and
a memory coupled to the processor, wherein the memory comprises instructions which, when executed by the processor, cause the processor to:
store sent and received chat entries in a chat session data structure wherein the chat session data structure stores a history of chat entries of a chat session;
receive user selection of a plurality of chat entries belonging to a virtual discussion thread in a chat session graphical user interface of the chat session;
mark the plurality of chat entries as belonging to the virtual discussion thread in the chat session data structure, wherein each chat entry within the plurality of chat entries in the chat session data structure comprises a message identifier, a user identifier, a timestamp, a chat message text, and a virtual discussion thread identifier;
add a message identifier for each of plurality of chat entries to a virtual discussion entry in a virtual discussion data structure, wherein the virtual discussion entry in the virtual discussion data structure comprises a virtual discussion thread identifier, a message identifier list, and an evidence mode field; and
activate an evidence mode corresponding to the evidence mode field for the plurality of chat entries in the chat session graphical user interface;
wherein receiving user selection of the plurality of chat entries comprises:
receiving user selection of a portion of a chat message associated with a given chat entry within the plurality of chat entries; and
identifying coordinates of the selected portion of the chat message, wherein the coordinates comprise a start position and end position that identify the first and last characters of the selected portion of the chat message that belongs to the virtual discussion thread, wherein marking the plurality of chat entries as belonging to the virtual discussion thread comprises storing the coordinates in association with the message identifier of the chat message in the given chat entry in the chat session data structure such that an unselected portion of the chat message is not marked as belonging to the virtual discussion thread.

15. The apparatus of claim 14, wherein the evidence mode comprises hiding chat entries that do not belong to the virtual discussion thread.

16. The apparatus of claim 14, wherein the instructions further cause the processor to:

receive a current chat message;

generate a current chat entry for the current chat message in the chat session data structure;

mark the current chat entry as belonging to the virtual discussion thread; and add a message identifier of the current chat message to the virtual discussion entry of the virtual discussion thread in the virtual discussion data structure.

17. The apparatus of claim 14, wherein the instructions further cause the processor to:

receive a broadcast chat entry and related virtual discussion thread information for the broadcast chat entry from a chat server;

determine whether the broadcast chat entry belongs to the virtual discussion thread based on the related virtual discussion thread information; and responsive to a determination that the broadcast chat entry belongs to the virtual discussion thread, add a message identifier of the broadcast chat entry to the virtual discussion entry of the virtual discussion thread in the virtual discussion data structure and activate the evidence mode for the broadcast chat entry.

\* \* \* \* \*